(12) United States Patent
Inoue et al.

(10) Patent No.: US 7,814,743 B2
(45) Date of Patent: Oct. 19, 2010

(54) CONTROL APPARATUS FOR INTERNAL COMBUSTION ENGINE

(75) Inventors: Toshio Inoue, Gotemba (JP); Tsukasa Abe, Gotemba (JP); Shunsuke Fushiki, Susono (JP); Mamoru Tomatsuri, Toyota (JP); Daigo Ando, Nisshin (JP); Keiko Hasegawa, Toyota (JP); Osamu Harada, Toyota (JP); Katsuhiko Yamaguchi, Nisshin (JP); Keita Fukui, Toyota (JP); Yukihiro Sonoda, Sunto-gun (JP); Koji Morita, Mishima (JP); Takuji Matsubara, Nagoya (JP); Yusuke Nakayama, Gotemba (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 1302 days.

(21) Appl. No.: 11/338,808

(22) Filed: Jan. 25, 2006

(65) Prior Publication Data

US 2006/0168944 A1 Aug. 3, 2006

(30) Foreign Application Priority Data

Jan. 31, 2005 (JP) ............................. 2005-023302
Oct. 19, 2005 (JP) ............................. 2005-304361

(51) Int. Cl.
*F01N 3/00* (2006.01)

(52) U.S. Cl. ............................. 60/284; 60/285; 60/289; 123/431; 123/295

(58) Field of Classification Search ................. 123/431, 123/295; 60/284, 285, 289

See application file for complete search history.

(56) References Cited

U.S. PATENT DOCUMENTS

| 5,909,720 | A | 6/1999 | Yamaoka et al. |
| 2002/0066436 | A1* | 6/2002 | Majima et al. ......... 123/406.47 |
| 2003/0213449 | A1 | 11/2003 | Bloms et al. |
| 2004/0000282 | A1 | 1/2004 | Kataoka et al. |
| 2004/0007403 | A1* | 1/2004 | Tomatsuri et al. .......... 180/65.2 |
| 2005/0016486 | A1 | 1/2005 | Hayman |
| 2005/0205029 | A1 | 9/2005 | Takemura et al. |

FOREIGN PATENT DOCUMENTS

| DE | 100 25 072 A1 | 7/2002 |
| DE | 102 60 748 A1 | 7/2004 |
| EP | 1 298 303 A2 | 4/2003 |
| EP | 1 577 511 A2 | 9/2005 |
| JP | A-10-82332 | 3/1998 |
| JP | A 2000-064874 | 2/2000 |

(Continued)

*Primary Examiner*—Thomas E Denion
*Assistant Examiner*—Jesse Bogue
(74) *Attorney, Agent, or Firm*—Oliff & Berridge, PLC

(57) ABSTRACT

In an engine 5 including an in-cylinder injector, the valve timing of an intake valve is retarded by VVT (Variable Valve Timing) controlled by an engine ECU to decompress in a combustion chamber at engine startup. In accordance with a configuration in which the valve timing of intake valve is advanced in a stepped manner from an initial set value, fuel injection from in-cylinder injector is inhibited during the time when the advance is equal to or below a predetermined standard value, and fuel injection from in-cylinder injector is allowed when exceeding the predetermined standard value, whereby degradation in the exhaust emission level in accordance with start time decompression control can be suppressed.

12 Claims, 14 Drawing Sheets

FOREIGN PATENT DOCUMENTS

| | | |
|---|---|---|
| JP | A 2001-073854 | 3/2001 |
| JP | A-2004-36429 | 2/2004 |
| JP | A 2004-052551 | 2/2004 |
| JP | A-2004-316561 | 11/2004 |
| JP | A 2005-325782 | 11/2005 |
| WO | WO 2004/061274 | 7/2004 |

* cited by examiner

CONTROL APPARATUS FOR INTERNAL COMBUSTION ENGINE

This nonprovisional application is based on Japanese Patent Applications Nos. 2005-023302 and 2005-304361 filed with the Japan Patent Office on Jan. 31, 2005 and Oct. 19, 2005, respectively, the entire contents of which are hereby incorporated by reference.

BACKGROUND OF THE INVENTION

1. Field of the Invention

The present invention relates to a control apparatus for an internal combustion engine, and particularly to the start time control of an internal combustion engine that includes a mechanism for directly injecting fuel into a cylinder.

2. Description of the Background Art

From the standpoint of increasing the engine performance, a variable valve timing (VVT) mechanism that allows variable timing of opening/closing an intake valve and an exhaust valve is employed. On the basis of this VVT mechanism, there is proposed the control of reducing the effective compression ratio by retarding the valve timing of the intake valve at the time of starting the engine (hereinafter, also referred to as "start time decompression control") in a hybrid vehicle whose engine that includes an in-cylinder injector (in-cylinder injection valve) is operated intermittently (for example, Japanese Patent Laying-Open No. 2000-64874; referred to as Patent Document 1 hereinafter). The start time decompression control is advantageous in that the initial expansion torque at the engine is reduced to suppress engine vibration and reduce cranking resistance to ensure smooth starting capability.

The technique of suppressing increase in the combustion variation is also disclosed for the in-cylinder injection type internal combustion engine. In the implementation of the intake valve delayed closing control in which the closing timing of the intake valve is set at the retarded side than the piston intake bottom dead center (Atkinson cycle), the pressure of fuel injection from the fuel injection valve is set higher or the fuel injection time more advanced than when the Atkinson cycle is not executed, whereby increase in the combustion variation is suppressed (for example, Japanese Patent Laying-Open No. 2004-52551; hereinafter referred to as Patent Document 2).

Further, there is proposed an internal combustion engine including a main fuel injection valve (in-cylinder injector) injecting fuel directly into a cylinder (into a combustion chamber) and an auxiliary fuel injection valve (intake manifold injector) injecting fuel into an intake manifold (for example, Japanese Patent Laying-Open No. 2001-73854; referred to as Patent Document 3 hereinafter). In this internal combustion engine, fuel injection from the main fuel injection valve (in-cylinder injector) is inhibited for a predetermined period of time from startup that is determined according to the coolant temperature of the engine. Accordingly, emission of unburned components at the time of starting the engine is reduced to suppress wasteful fuel consumption.

Execution of decompression control by the VVT mechanism at the time of starting an internal combustion engine that includes an in-cylinder injector as in Patent Documents 1 and 2 is disadvantageous in that the pressure and temperature at the compression end in the cylinder will be reduced although vibration is suppressed to allow the engine to be started smoothly. Vaporization of the fuel injected from the in-cylinder injector will become insufficient to pose the problem of increased exhaust emission due to deterioration in burning.

Although Patent Document 3 is related to measures against exhaust emissions at the time of starting an engine that includes both an in-cylinder injector and an intake manifold injector, it is completely silent about measures for improving the exhaust emission level during start time decompression control based on the VVT mechanism.

SUMMARY OF THE INVENTION

In view of the foregoing, an object of the present invention is to prevent degradation in the exhaust emission level during start time decompression control based on intake valve control directed to smooth startup (for example, a VVT mechanism) in an internal combustion engine that includes at least a fuel injection mechanism for injecting fuel directly into a cylinder.

According to an aspect of the present invention, a control apparatus for an internal combustion engine includes a first fuel injection mechanism, and allows at least intake valve control for controlling the intake air amount into a combustion chamber by an intake valve. The control apparatus includes a starter portion, a start time decompression portion, a decompression cancel portion, a determination portion, and a start time fuel injection control portion. The first fuel injection mechanism is configured to inject fuel into the combustion chamber. The starter portion is configured to start the internal combustion engine. The start time decompression portion sets an intake air amount, such that the combustion chamber is decompressed at the time of starting the internal combustion engine, as the initial value of intake valve control. The decompression cancel portion gradually alters the intake air amount from the initial value such that the pressure in the combustion chamber increases than at startup, following startup of the internal combustion engine. The determination portion determines whether the compression state in the combustion chamber has reached a predetermined standard state. The start time fuel injection control portion inhibits fuel injection from the first fuel injection mechanism until the time when the determination portion determines that the compression state in the combustion chamber has reached the standard state, and allows fuel injection from the first fuel injection mechanism after that time arriving at the standard state, at the startup of the internal combustion engine.

In the control apparatus for an internal combustion engine set forth above, decompression control in the combustion chamber is conducted by the intake valve control (for example, retarding the intake valve closing timing) such that the vibration (shock) at the time of starting the internal combustion engine is alleviated, and a period of inhibiting fuel injection from the first fuel injection mechanism, i.e. in-cylinder fuel injection inhibition period, is provided until the compression state in the combustion chamber returns to the standard state of the normal level from the pressure-reduced state at the time of startup. Since in-cylinder fuel injection can be inhibited during the period of time when vaporization of the in-cylinder injected fuel is aggravated by the decompression in the combustion chamber, degradation in the exhaust emission level during start time decompression control according to intake valve control can be suppressed.

Preferably in the control apparatus for an internal combustion engine of the present invention, the internal combustion engine further includes a second fuel injection mechanism configured to inject fuel into the intake manifold. The start time fuel injection control portion inhibits fuel injection from the first fuel injection mechanism and instructs fuel injection by the second fuel injection mechanism until the time when the determination portion determines that the compression state in the combustion chamber has reached the standard state.

In accordance with the control apparatus set forth above for an internal combustion engine that includes both a first fuel injection mechanism (in-cylinder injector) and a second fuel injection mechanism (intake manifold injector) and that conducts decompression control in the combustion chamber by intake valve control (for example, retarding the intake valve closing timing) such that the vibration (shock) at the time of starting the internal combustion engine is alleviated, fuel can be injected from the second fuel injection mechanism during the in-cylinder fuel injection inhibition period provided for the purpose of preventing degradation in the exhaust emission level. Therefore, degradation in the exhaust emission level can be suppressed and engine output ensured to improve the starting capability during start time decompression control by intake valve control.

In the control apparatus for an internal combustion engine of the present invention, the internal combustion engine is preferably incorporated into a vehicle together with a motive power source besides the internal combustion engine. The control apparatus further includes a start time motive power partake control portion instructing generation of motive power for the vehicle by the motive power source until the time when the determination portion determines that the compression state in the combustion chamber has reached the standard state.

In accordance with the configuration in which an internal combustion engine including at least a first fuel injection mechanism (in-cylinder injector) is incorporated into a hybrid vehicle, the motive power of the vehicle can be generated by another motive power source (for example, an electric motor) during an in-cylinder fuel injection inhibition period provided for the purpose of preventing degradation in the exhaust emission level during decompression control in the combustion chamber by intake valve control such that the vibration (shock) at the time of starting the internal combustion engine is alleviated. Therefore, degradation in the exhaust emission level is suppressed and the vehicle motive power ensured to improve the starting capability when start time decompression control by intake valve control is conducted.

Further preferably in the control apparatus for an internal combustion engine of the present invention, the start time fuel injection control portion establishes a fuel injection inhibition period of the first fuel injection mechanism until the catalyst through which exhaust from the internal combustion engine passes is rendered active.

In the control apparatus for an internal combustion engine set forth above, an in-cylinder fuel injection inhibition period is established corresponding to the intake valve control directed to decompressing the combustion chamber until activation of the catalyst (for example, a 3-way catalytic converter) during which degradation in the exhaust emission level is of particularly an issue. Therefore, degradation in the exhaust emission level during start time decompression control by intake valve control can be suppressed during the period of time when the emission removal effect by the catalyst is poor.

Further preferably in the control apparatus for an internal combustion engine of the present invention, the start time fuel injection control portion allows fuel injection from the first fuel injection mechanism regardless of the determination by the determination portion during warm up operation of the catalyst through which exhaust from the internal combustion engine passes.

With regards to the execution timing of the catalyst warm up operation in the control apparatus for an internal combustion engine set forth above, a catalyst warm up operation with in-cylinder fuel injection can be executed without fuel injection inhibition control by the first fuel injection mechanism (in-cylinder fuel injection) based on the determination by the determination portion. Since catalyst warm up is completed at an early stage from engine startup to ensure the emission removal effect by the catalyst, the total exhaust emission level improvement effect can be improved.

Thus, the present invention is mainly advantageous in that degradation in the exhaust emission level can be prevented during start time decompression control by intake valve control (for example, VVT mechanism) directed to smooth startup in an internal combustion engine including at least a fuel injection mechanism that directly injects fuel into a cylinder.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
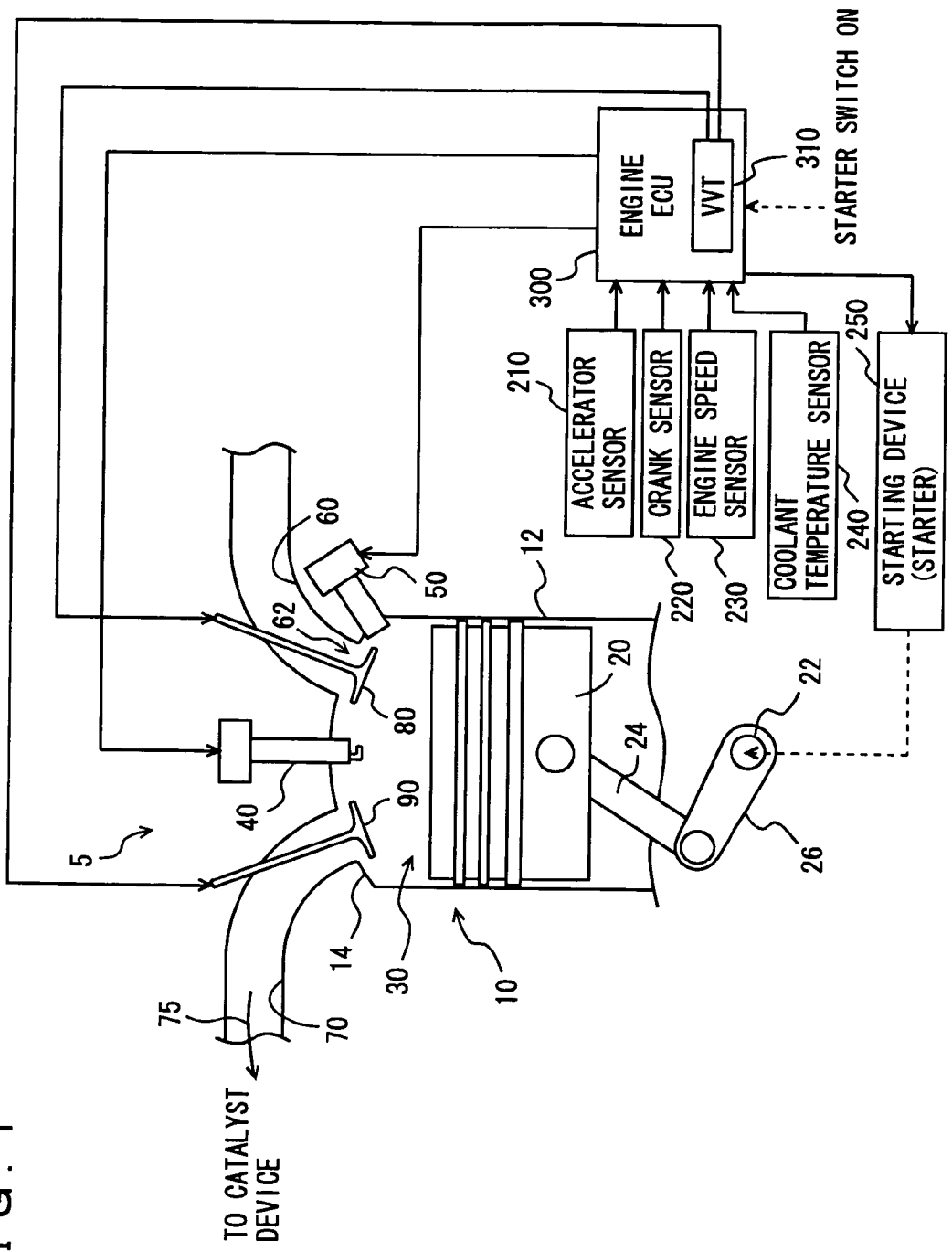
FIG. 1 schematically shows a structure of an engine system under control of a control apparatus for an internal combustion engine according to a first embodiment of the present invention.

Embodiments of the present invention will be described in detail hereinafter with reference to the drawings. The same or corresponding elements in the drawings have the same reference characters allotted, and detailed description thereof will not be repeated in principle.

First Embodiment

An engine system under control of an engine ECU (Electronic Control Unit) that is a control apparatus for an internal combustion engine according to a first embodiment of the present invention will be described with reference to FIG. 1. Although one cylinder of an engine is shown representatively, the number of cylinders and arrangement thereof in the internal combustion engine to which the embodiment of the present invention is applied are not limited.

Referring to FIG. 1, an engine 5 is formed of a cylinder 10 including a cylinder block 12 and a cylinder head 14 connected above cylinder block 12, and a piston 20 that moves back and forth in cylinder 10. Piston 20 has a connecting rod 24 and a crank arm 26 connected to a crankshaft 22 that is the output shaft of engine 5. The reciprocating movement of piston 20 is converted into the rotation of crankshaft 22 by means of connecting rod 24. In cylinder 10, the inner wall of cylinder block 12 and cylinder head 14 and the top plane of piston 20 constitute the partition for a combustion chamber 30 in which air-fuel mixture is burned.

Cylinder head 14 is provided with a spark plug 40 protruding into combustion chamber 30 to ignite the air-fuel mixture, and an in-cylinder injector 50 injecting fuel into combustion chamber 30. Combustion chamber 30 communicates with an intake manifold 60 and an exhaust manifold 70 via an intake valve 80 and an exhaust valve 90, respectively.

Exhaust manifold 70 is connected to a catalyst device (for example, a 3-way catalytic converter) not shown to remove the emission (CO: carbon monoxide; HC: hydrocarbon; NOx: nitrogen oxide) in exhaust 75. Since the emission removal function of the catalyst device is low until the temperature of the catalyst rises and the catalyst is rendered active, control must be effected such that emission in exhaust 75 does not increase due to degradation in the burning status in combustion chamber 30 when at low temperature.

Various sensors are provided for engine 50 such as an accelerator sensor 210, a crank sensor 220, an engine speed sensor 230, and a coolant temperature sensor 240.

Accelerator sensor 210 is provided in the proximity of the accelerator pedal (not shown) to detect the accelerator pedal position (press-down degree). The detected value from accelerator sensor 210 is appropriately subjected to A/D conversion at engine ECU 300 to be provided to a microcomputer in engine ECU 300.

Crank sensor 220 is formed of a rotor attached to crankshaft 22 of engine 5, and an electromagnetic pickup, located in the proximity of the rotor for detecting the passage of a projection provided at the outer circumference of the rotor. Crank sensor 220 generates a pulse signal indicating the rotation phase (crank angle) of crankshaft 22. Engine speed sensor 230 generates a pulse signal indicating the engine speed. The pulse signals from crank sensor 220 and engine speed sensor 230 are provided to the microcomputer in engine ECU 300.

Coolant temperature sensor 240 is provided at the channel of the coolant for engine 5, and provides an output voltage in proportion to the engine coolant temperature. The output voltage from coolant temperature sensor 240 is appropriately subjected to A/D conversion at engine ECU 300 to be provided to the microcomputer in engine ECU 300.

Engine ECU 300 executes a predetermined program through the microcomputer to generate various control signals to control the overall operation of the engine system based on the signals from respective sensors.

A starting device (starter) 250 is provided for engine 5. In general, a starter 250 is formed of an electrical motor that is energized in response to an operation instruction from engine ECU 300. When an operation instruction is issued from engine ECU 300, the flywheel (not shown) of engine 5 is rotated by starter 250 to start the engine running. The operation instruction to starter 250 is issued in response to the starter switch being turned on through a key operation by the driver.

Engine ECU 300 further includes a valve timing control portion (VVT control portion) 310 controlling the opening/closing timing of intake valve 80 and exhaust valve 90. Intake valve 80 and exhaust valve 90 can open/close at the timing corresponding to an instruction from VVT control portion 310. By the valve timing control, "intake valve control" of the present invention that controls the amount of intake air introduced into combustion chamber 30 (the intake introduction amount) is conducted.

Although a configuration in which the aforementioned intake valve control is implemented by valve timing control in the embodiments of the present invention is exemplified, intake valve control may be implemented by controlling the amount of valve lift instead of the valve timing, or by controlling both the valve timing and the valve lift.

In the control apparatus for an internal combustion engine in the embodiments of the present invention, decompression control in combustion chamber 30 is executed by VVT control portion 310 when engine 5 is started. VVT control at the time of starting the engine (hereinafter also referred to as "start time VVT (start time decompression control)" will be described hereinafter with reference to FIGS. 2-4.

Figure 2:
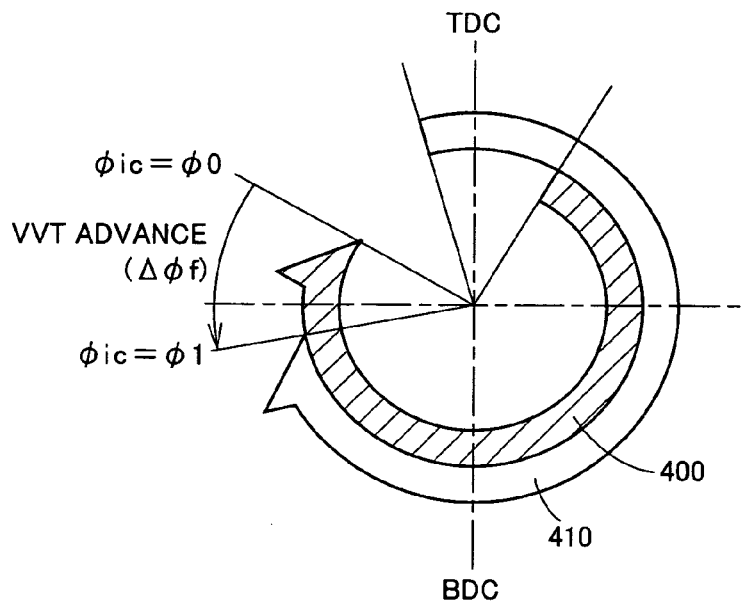
FIG. 2 is a conceptual diagram to describe timing control of an intake valve by start time VVT.

Referring to FIG. 2, the intake valve closing timing (intake valve closing timing $\phi ic=\phi 0$) is retarded at a valve timing initial state 400 of the intake valve at engine startup (for example, $\phi 0$ is retarded than 90 degrees BTDC). Accordingly, the pressure in combustion chamber 30 can be reduced by the initial setting of the intake introduction amount into combustion chamber 30 such as by closing intake valve 80 after the intake air from intake valve 80 is returned to intake manifold 60 for transition to the compression operation. Since intake manifold 60 corresponds to the atmospheric pressure when the engine is started, the explosion shock at the time of initial ignition is liable to be increased by the higher air charging efficiency into combustion chamber 30 than when operation is continued. However, the pressure in the combustion chamber is reduced by the initial setting set forth above (retardation such as valve timing initial state 400) to allow reduction in vibration at engine startup.

During the engine startup sequence, the valve timing is gradually advanced from initial state 400. Accordingly, the intake introduction amount changes to increase the pressure in combustion chamber 30. Accordingly, the decompression in combustion chamber 30 is gradually released.

When the VVT advance reaches a predetermined value and the valve timing attains a predetermined state 410 (intake valve closing timing $\phi ic=\phi 1$), the start time VVT ends. Valve timing 410 is determined in advance corresponding to the intake introduction amount that can stabilize combustion upon evaluating the amount of emission in the engine exhaust gas, the torque variation, specific fuel consumption, and the like.

Figure 3:
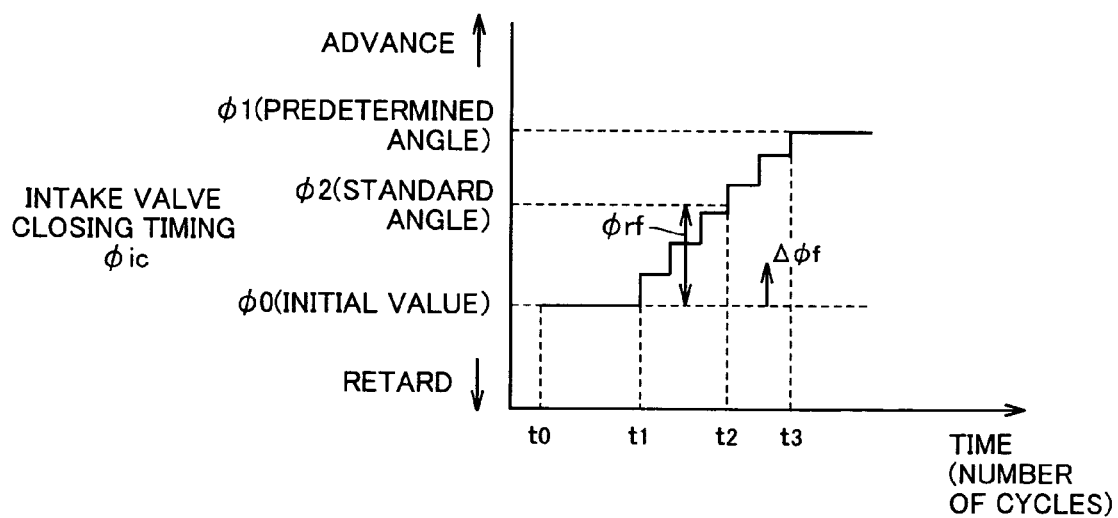
FIG. 3 is a diagram to describe the setting of the intake valve closing timing with start time VVT.

FIG. 3 represents change in the intake valve closing timing at start time VVT.

Referring to FIG. 3, intake valve closing timing $\phi ic$ is initially set to the initial angle $\phi 0$ corresponding to initial state 400 at time t0 corresponding to engine startup. At time t1 and et seq. where the VVT mechanism becomes operable by attaining the required oil pressure (in the case of hydraulic type VVT) or energization (in the case of electric type VVT), the valve timing of the intake valve is advanced in a stepped manner to gradually release the decompression in combustion chamber 30. Advance value $\Delta\phi f$ of intake valve timing $\phi ic$ is gradually increased.

At time t3 when the intake valve closing timing $\phi ic$ reaches a predetermined angle $\phi 1$ corresponding to predetermined state 410, the start time VVT is ended. The valve timing thereafter (the intake introduction amount into combustion chamber 30) will be set according to a map based on the parameters of the engine operation condition (engine speed, load factor, and the like) taking into account the fuel consumption, emission, combustion torque variation and the like according to the engine operation status.

Figure 4:
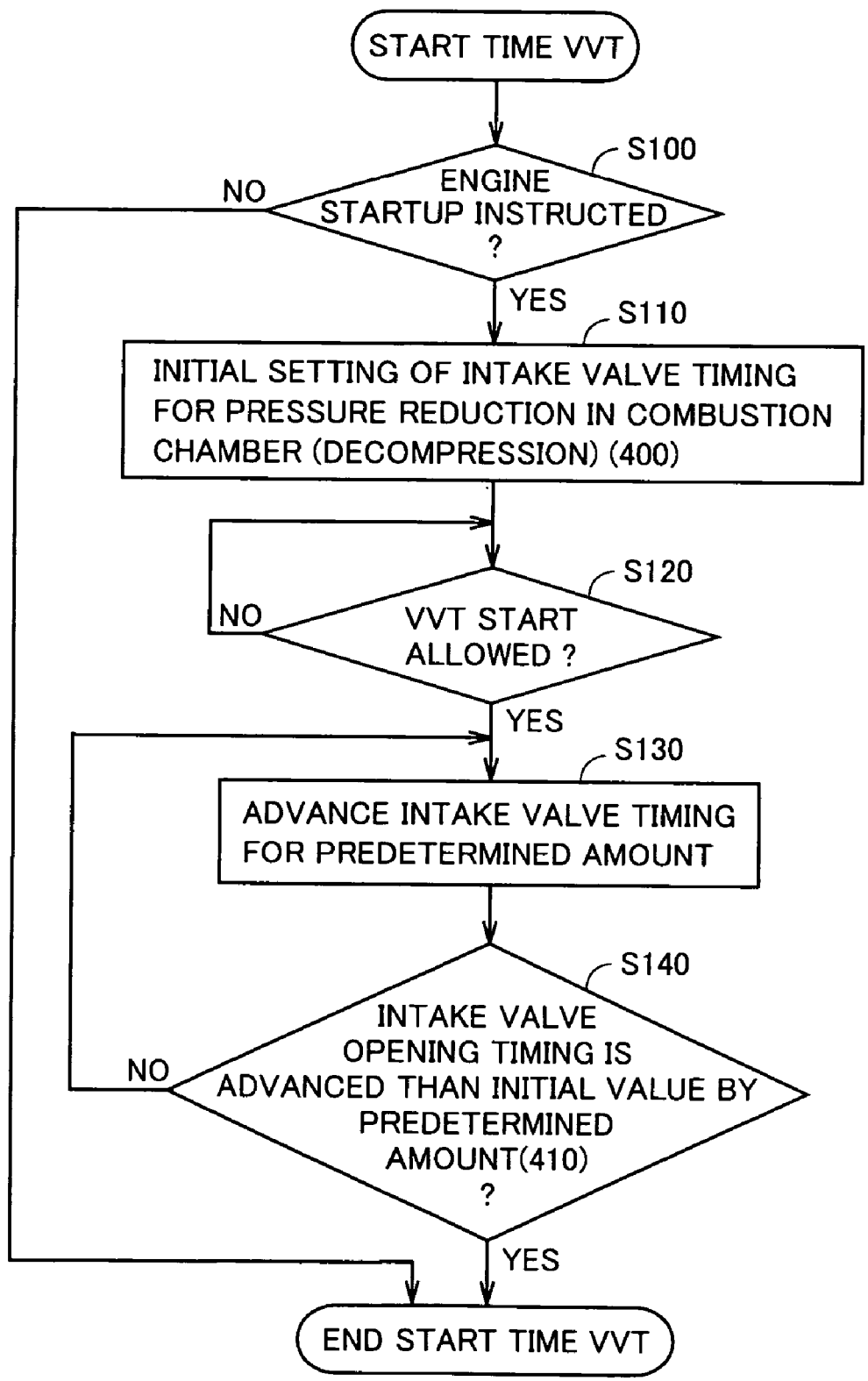
FIG. 4 is a flow chart to describe the start time VVT according to an embodiment of the present invention.

FIG. 4 is a flow chart to describe the start time VVT according to the embodiments of the present invention. The start time VVT of FIG. 4 is executed in accordance with a predetermined program prestored in VVT control portion 310, or by a dedicated hardware mechanism (not shown). It is to be noted that the present invention is not limited to the system of the VVT mechanism (intake valve control).

Referring to FIG. 4, start time VVT is initiated in response to an engine starting instruction through a key operation or the like by the driver (determination of YES at step S100). At a vehicle in which engine intermittent operation is conducted such as a hybrid vehicle incorporating a motive power source (for example, an electric motor) besides the engine, an engine starting instruction is issued not directly in relation to a key operation by the driver.

At the time of starting the engine, valve timing 400 (FIG. 2) to reduce the pressure in the combustion chamber (decompression) is initialized (step S110). Until the VVT mechanism becomes operable (determination of NO at step S120), the valve timing is maintained at the initial setting, as indicated at time t0-t1 in FIG. 3. VVT can be started when the VVT mechanism becomes operable as a result of the oil pressure (in the case of hydraulic type VVT) or energization (in the case of electric type VVT) being ensured (determination of YES at step S120). The valve timing of the intake valve is gradually advanced by every predetermined amount (step S130). Accordingly, VVT advance $\Delta\phi f$ is gradually increased as indicated by time t1 onward of FIG. 3. In accordance with the advance of the valve timing of the intake valve, the intake introduction amount changes to increase the pressure in combustion chamber 30. Specifically, the pressure in combustion chamber 30 is gradually increased than the initial pressure (at the time of startup) by the intake introduction amount becoming greater than that of startup. Accordingly, fuel vaporization is promoted by the increase of the temperature at the compression end, whereby the combustion performance is gradually improved.

The valve timing of the intake valve is gradually advanced until attaining a predetermined state 410 shown in FIG. 2 (determination of NO at step S140). When the VVT advance $\Delta\phi f$ attains a predetermined amount (corresponding to intake valve closing timing $\phi ic=\phi 1$), the start time VVT is ended (determination of YES at step S140).

The standard angle $\phi 2$ is set for intake valve closing timing $\phi ic$ during the range starting from the initial angle $\phi 0$ (corresponding to initial state 400) to a predetermined angle $\phi 1$ (corresponding to predetermined state 410). Control of allowing fuel injection by in-cylinder injector 50 is effected with standard angle $\phi 2$ as the threshold, as will be described hereinafter.

In the start time fuel injection control by the control apparatus for an internal combustion engine of the present invention, determination is made of the pressure state in combustion chamber 30 according to the VVT advance by start time VVT, whereby fuel injection from in-cylinder injector 50 at engine startup is controlled.

Figure 5:
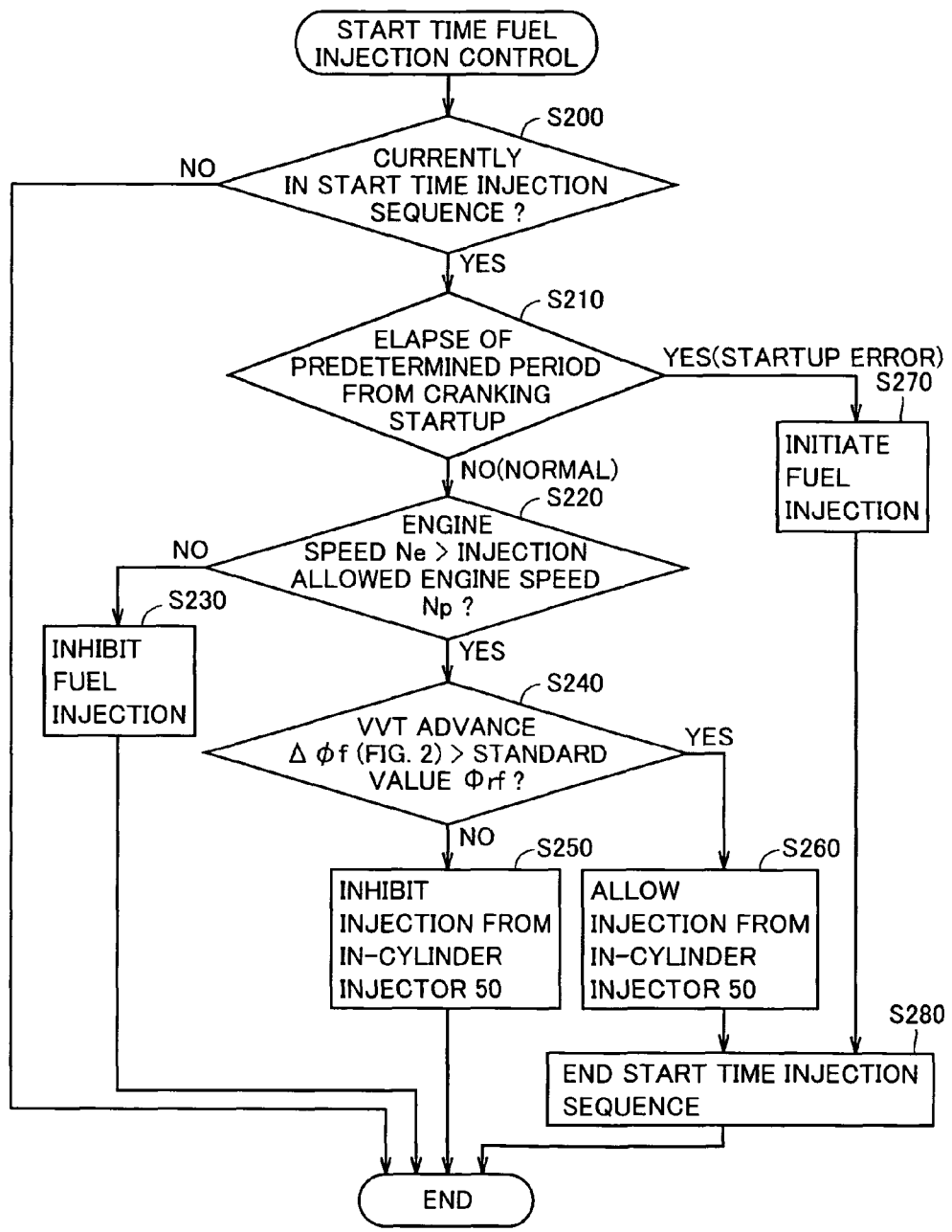
FIG. 5 is a flow chart to describe start time fuel injection control according to the first embodiment of the present invention.

FIG. 5 is a flow chart to describe start time fuel injection control according to the first embodiment of the present invention. The start time fuel injection control of FIG. 5 is executed by a predetermined program prestored at engine ECU 300.

Referring to FIG. 5, the start time fuel injection control of the first embodiment is executed during a startup injection sequence (step S200). Since the start time fuel injection control is not executed when not during the start time injection sequence (determination of NO at step S200), control is ended in such a case. As part of the engine starting sequence, the start time VVT of FIG. 4 is executed concurrently with the start time injection sequence.

During the start time injection sequence (determination of YES at step S200), fuel injection control set forth below is executed when within a predetermined period from the start of cranking (determination of NO at step S210).

Following engine starting by starter 250, and until the engine speed Ne reaches an injection allowed engine speed Np (determination of NO at step S220), fuel injection per se is inhibited (step S230).

When the engine speed Ne becomes equal to or greater than the injection allowed engine speed Np (determination of YES at step S220), determination is made as to whether VVT advance $\Delta\phi f$ of FIG. 2 has reached a standard advance value $\phi rf$ corresponding to standard angle $\phi 2$ (step S240).

In the case where the valve timing of the intake valve is retarded by decompression control, exhaust emission level is degraded since atomization of fuel injected from in-cylinder injector 50 is not promoted due to the low temperature at the compression end caused by decompression. Therefore, by obtaining empirically the relationship of exhaust emission level degradation in an in-cylinder fuel injection mode with respect to VVT advance $\Delta\phi f$, a standard advance value $\phi rf$ is preset. This corresponds to a standard state that is a compression state that allows degradation in the exhaust emission level to be suppressed through some improvement of the combustion state. Specifically at step S240, determination is made whether the compression state in combustion chamber 30 has reached the standard state set forth above based on VVT advance $\Delta\phi f$.

During the period of time in which VVT advance $\Delta\phi f$ has not yet reached the standard advance value $\phi rf$, i.e. during time t1-t2 in FIG. 3 (determination of NO at step S240), fuel injection from in-cylinder injector 50 is inhibited to prevent degradation in the exhaust emission level (step S250).

Subsequent to VVT advance $\Delta\phi f$ reaching standard value $\phi rf$ (determination of YES at step S240), i.e. at time t2 onward in FIG. 3, fuel injection from in-cylinder injector 50 is allowed (step S260). When fuel injection from in-cylinder injector 50 is allowed at step S260, the start time injection sequence is ended (step S280).

By the starting time fuel injection control set forth above, it is possible to suppress degradation in the exhaust emission level that may occur during start time decompression control by the VVT mechanism for the purpose of suppressing startup shock in an internal combustion engine including an in-cylinder injector 50.

At an elapse of a predetermined period from the start of cranking during a start time injection sequence (determination of YES at step S210), determination is made of startup error occurrence. Such startup error occurs when the engine speed cannot be readily increased due to an extremely low temperature or by insufficient battery charging. In this case, initiation of fuel injection is allowed without conducting in-cylinder injection inhibition control directed to preventing degradation in exhaust emission level shown at steps S220-S260, in order to give engine startup top priority (step S270), and the start time injection sequence is ended (step S280).

Second Embodiment

Figure 6:
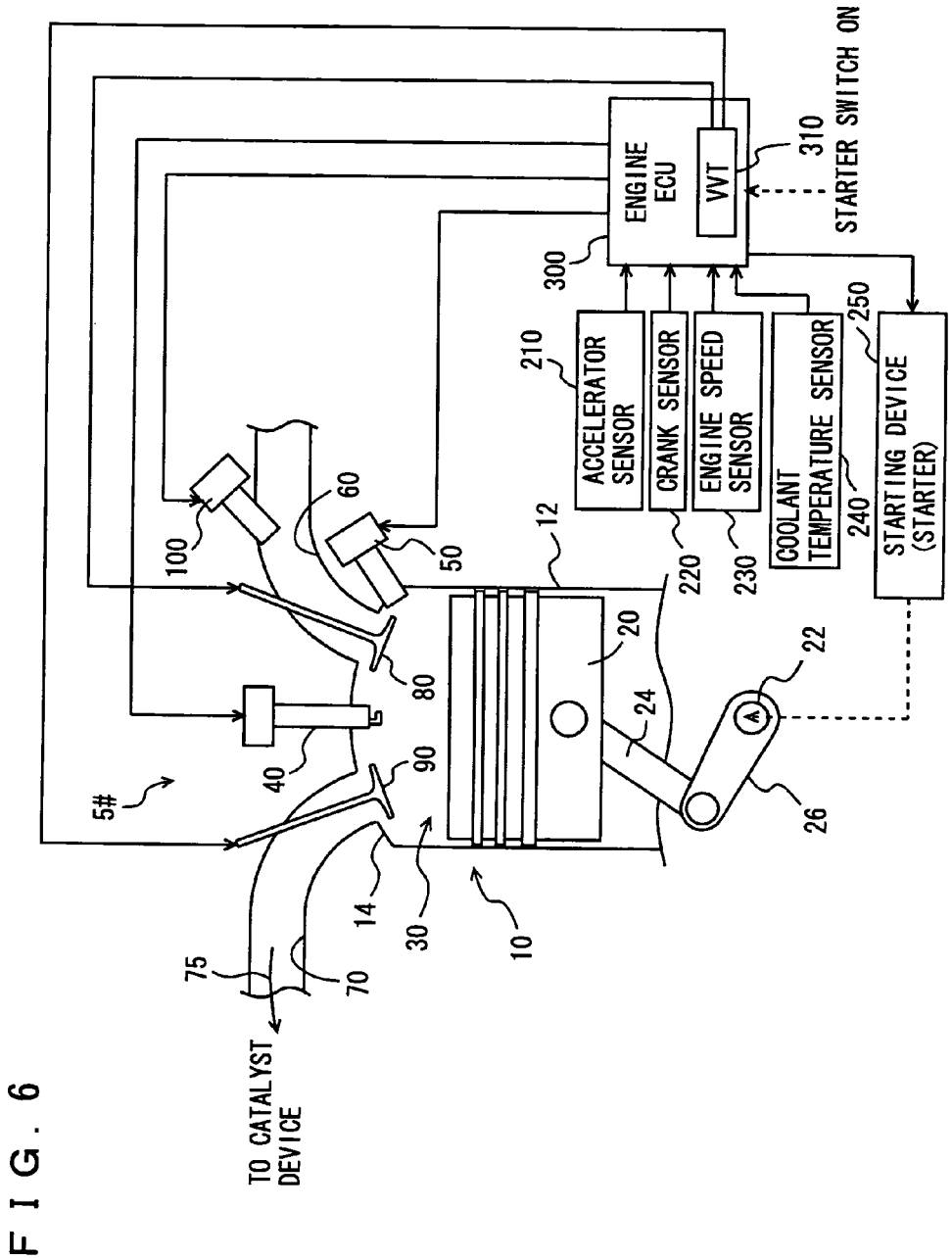
FIG. 6 schematically shows a structure of an engine system under control of a control apparatus for an internal combustion engine according to a second embodiment of the present invention.

FIG. 6 schematically shows a configuration of an engine system under control of a control apparatus for an internal combustion engine according to a second embodiment of the present invention.

On the basis of comparison with FIG. 1, an engine 5# of the second embodiment shown in FIG. 6 has an intake manifold injector 100 additionally attached at intake manifold 60. Intake manifold injector 100 supplies fuel to intake port 62 and/or intake manifold 60 that is the communicating portion between intake manifold 60 and combustion chamber 30. Although the second embodiment will be described on the basis of an internal combustion engine having in-cylinder injector 50 and intake manifold injector 100 provided separately, application of the present invention is not limited to such an internal combustion engine. For example, the present invention is applicable to an internal combustion engine that has one injector that includes both an in-cylinder injection function and intake manifold injection function.

The configuration of other elements in engine 5# is similar to that of engine 5 shown in FIG. 1. Therefore, details of the description thereof will not be repeated. Engine 5# executes start time VVT (start time decompression control by intake valve control) by the VVT mechanism described with reference to FIGS. 2-4.

Figure 7:
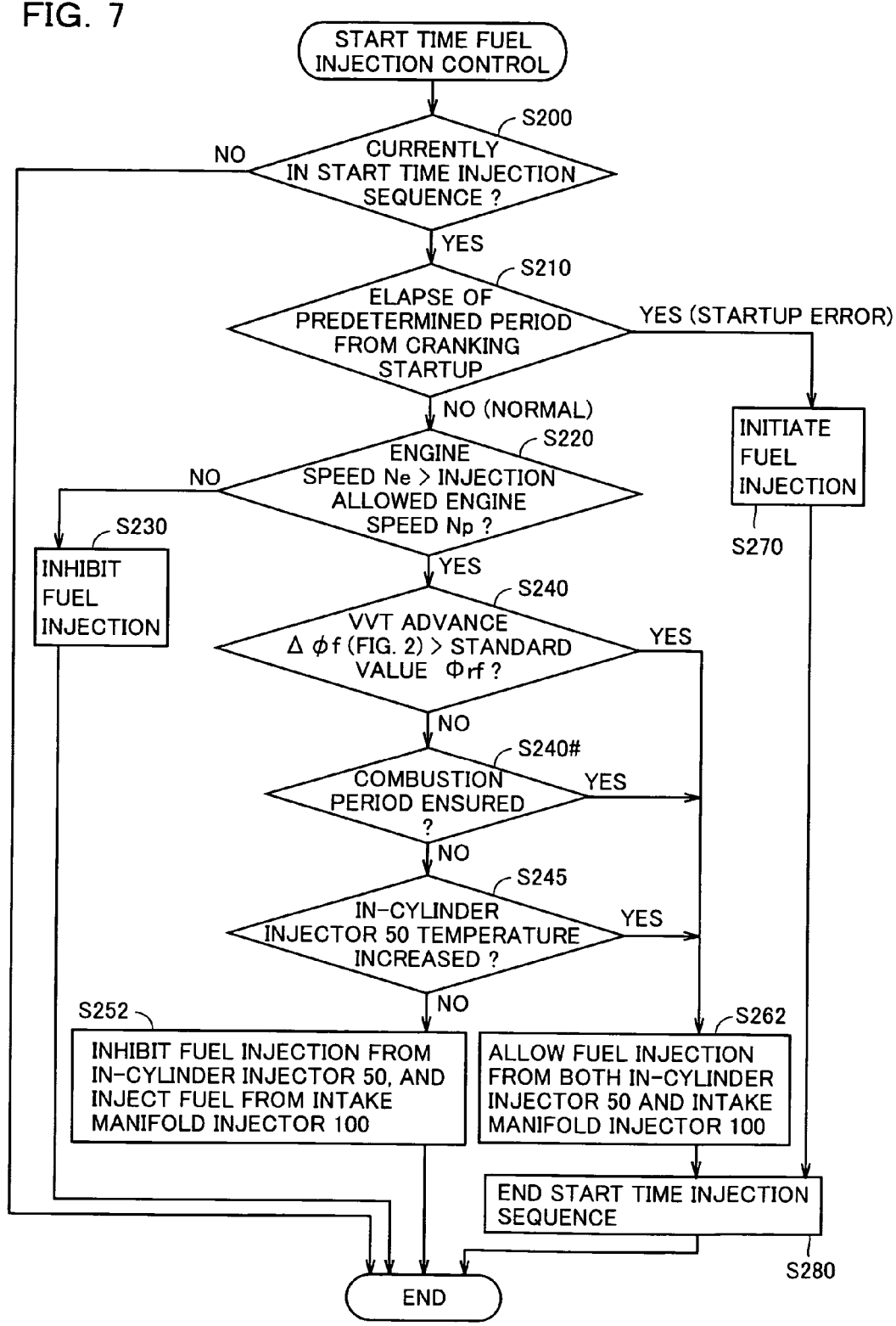
FIG. 7 is a flow chart to describe start time fuel injection control according to the second embodiment of the present invention.

FIG. 7 is a flow chart to describe start time fuel injection control according to the second embodiment of the present invention. The start time fuel injection control of FIG. 7 is executed by a predetermined program that is prestored in engine ECU 300.

Start time fuel injection control according to the second embodiment shown in FIG. 7 differs from the start time fuel injection control based on FIG. 5 in that steps S252 and S262 are executed instead of steps S250 and S260, respectively. Furthermore, the flow chart of FIG. 7 further includes a step S240# and a step S245 executed when determination of NO is made at step S240. The control flow of the remaining elements is similar to that described with reference to FIG. 5. Therefore, detailed description thereof will not be repeated.

During the time until VVT advance Δϕf reaches standard value ϕrf (determination of NO at step S240; time t1-t2 in FIG. 3), fuel injection from in-cylinder injector 50 is inhibited while fuel injection from intake manifold injector 100 is allowed (step S252) when determination is made of NO at both steps S240# and S245.

When VVT advance Δϕf reaches standard value ϕrf (determination of YES at step S240; time t2-t3 in FIG. 3), and when at least one of steps S240# and S245 results in the determination of YES before VVT advance Δϕf reaches standard value ϕrf, fuel injection from both in-cylinder injector 50 and intake manifold injector 100 is allowed (step S262).

At step S240#, determination is made whether combustion at combustion chamber 30 based on fuel injection from intake manifold injector 100 in accordance with the setting at step S252 has been ensured for at least a predetermined period of time. Determination of whether the predetermined period of time has been ensured or not can be made by whether a predetermined time (for example, several seconds) has elapsed from initiation of combustion, or whether ignition has been ensured a predetermined number of times.

When combustion has been ensured for a predetermined period of time (determination of YES at step S240#), step S262 is executed since the temperature at the compression end is boosted by the increased temperature in combustion chamber 30. Inhibition of using in-cylinder injector 50 is canceled, and fuel injection from both in-cylinder injector 50 and intake manifold injector 100 is allowed. The predetermined period is to be set so as to correspond to the standard state qualified as a compression state in which degradation in exhaust emission level can be suppressed by improvement of the combustion state described in the first embodiment. In fuel injection control of the second embodiment, determination as to whether the pressure state in combustion chamber 30 has reached the standard state or not can be made based on the determination as to whether combustion based on a fuel injection from intake manifold injector 100 alone has been conducted for a predetermined period of time.

When combustion has not been ensured for a predetermined period of time (determination of NO at step S240#), step S245 is further executed to determine whether the temperature of in-cylinder injector 50 has rised or not.

Since cooling based on latent heat of vaporization of injection fuel is not conducted during inhibition of the usage of in-cylinder injector 50, the injector temperature rises. In view of the danger of malfunction due to excessive increase in temperature at in-cylinder injector 50, step S262 is executed when the temperature at in-cylinder injector 50 (or estimated temperature) becomes equal to or greater than a standard temperature (determination of YES at step S245). By canceling inhibition of the usage of in-cylinder injector 50 through step S262, fuel injection from in-cylinder injector 50 is ensured to obviate excessive high temperature that will induce malfunction.

When the temperature at in-cylinder injector 50 (or estimated temperature) has not reached the standard temperature (determination of NO at step S245), step S252 is executed. Accordingly, fuel injection by in-cylinder injector 50 is inhibited and fuel injection by intake manifold injector 100 is conducted in order to prevent degradation in the exhaust emission level.

At the time of starting the internal combustion engine that includes both an in-cylinder injector 50 and an intake manifold injector 100 corresponding to engine 5# of the second embodiment, in-cylinder fuel injection is inhibited, likewise the first embodiment, to prevent degradation in the exhaust emission level while ensuring the starting capability of engine 5# by fuel injection from intake manifold injector 100 during the period of time in which the exhaust emission level will be degraded when in-cylinder fuel injection is conducted under start time decompression control by VVT. Accordingly, degradation in the exhaust emission level is suppressed and engine output ensured to improve starting capability when the shock (vibration) at the time of engine starting is to be suppressed based on starting time decompression control by VVT.

The provision of step S240# allows the inhibited usage of in-cylinder injector 50 to be canceled to allow normal operation when the temperature at the compression end increases by combustion based on fuel injection from intake manifold injector 100. Further, the provision of step S245 allows the occurrence of injector clogging to be prevented by ensuring in-cylinder fuel injection before in-cylinder injector 50 attains an excessively high temperature state.

Third Embodiment

The third embodiment corresponds to start time fuel injection control for a hybrid vehicle further incorporating a motive power source (typically, an electric motor) besides an engine corresponding to the internal combustion engine described in the first or second embodiment. In vehicles that conduct engine intermittent operation such as the so-called echo-run vehicle including an economy running system, the frequency of engine startup is high. Therefore, the necessity of start time decompression control by VVT is high from the standpoint of ensuring driverability.

A schematic configuration of a hybrid vehicle will be described with reference to FIG. 8. A hybrid drive system 500 incorporated into a hybrid vehicle includes, in addition to an engine 540, a battery 510, a power control unit (PCU) 520 for power conversion, an electric motor 530, a power split device 550, a dynamo (generator) 560, a reduction gear 570, driving wheels 580a and 580b, and a hybrid ECU 590 controlling the overall operation of hybrid drive system 500.

Figure 8:
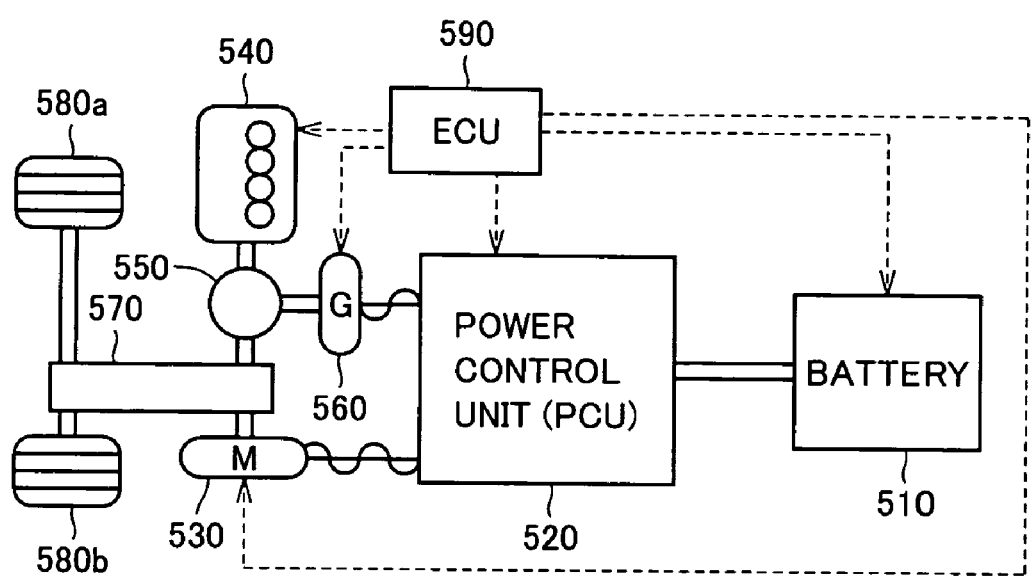
FIG. 8 schematically shows a structure of a hybrid vehicle in which an engine is incorporated under control of a control apparatus for an internal combustion engine according to a third embodiment of the present invention.

Although a hybrid system in which only the front wheels are driving wheels is shown in FIG. 8, an electric motor for driving the rear wheels can be provided to constitute a 4WD hybrid system.

Battery 510 is formed of a rechargeable secondary battery (for example, a nickel-hydrogen or lithium-iron secondary battery). Power control unit 520 includes an inverter (not shown) to convert the direct-current voltage supplied from battery 510 into alternating voltage for driving electric motor 530. The inverter is configured to allow bidirectional power conversion, and also includes the function of converting the generated energy (alternating voltage) by the regenerative braking operation of electric motor 530 and the generated power by generator 560 (alternating voltage) into direct-current voltage for charging battery 510.

Power control unit 520 may further include an up/down converter (not shown) to convert the level of the direct-current voltage. Arrangement of such an up/down converter allows electric motor 530 to be driven by an alternating voltage with an amplitude of a voltage higher than the voltage supplied by battery 510. Therefore, the electric motor driving efficiency can be improved.

The engine system shown in FIG. 1 or FIG. 6, for example, can be applied for engine 540. Power split device 550 can divide the motive power generated by the engine into a path for transmission to driving wheels 580a and 580b via reduction gear 570, and a path for transmission towards generator 560. Generator 560 is rotated by the power from engine 540 transmitted via power split device 550 to generate power. The power generated by generator 560 is used as the power to charge battery 510 or as the power to drive electric motor 530 by power conversion unit 520.

Electric motor 530 is driven rotatably by the alternating voltage supplied from power conversion unit 520. The power is transmitted to driving wheels 580a and 580b via reduction gear 570. During the regenerative braking operation mode in which electric motor 530 is rotated in accordance with the reduced rate of driving wheels 580a and 580b, electric motor 530 functions as a generator.

At the time of starting the vehicle and at the time of light load when running at low speed or running down a gentle slope, hybrid drive system 500 allows running by the motive power from electric motor 530 without using the motive power of engine 540 in order to avoid the region of poor engine efficiency. In this case, the operation of engine 540 is ceased except for the case where warm up operation is required. Engine 540 is operated under an idling state when warm up operation is required.

In a normal running mode, engine 540 is started and the motive power output therefrom is divided into the motive power of driving wheels 580a and 580b and the motive power for power generation at generator 560 by power split device 550. The generated power from generator 560 is used to drive electric motor 530. Therefore, driving wheels 580a and 580b are driven, assisting the motive power from engine 540 by the motive power from electric motor 530 in a normal running mode. Hybrid ECU 590 controls the power split ratio of power split device 550 such that the entire ratio becomes highest.

In an acceleration mode of full throttle, the power supplied from battery 510 is used for driving electric motor 530, whereby the motive power of driving wheels 580a and 580b is further increased.

During the time of deceleration and braking, electric motor 530 is driven rotatably by driving wheels 580a and 580b to generate power. The power collected by the regeneration of electric motor 530 is converted into direct-current voltage by power conversion unit 520 to be used for charging battery 510. Engine 540 is ceased automatically when the vehicle stops.

Hybrid drive system 500 conducts vehicle cruising with power consumption improved based on the combination of the motive power generated by engine 540 and the motive power generated by electric motor 530 based on the electric energy as the source, i.e. controlling the operation of engine 540 and electric motor 530 depending upon the driving status. Since engine 540 is operated intermittently depending upon the driving status in a hybrid vehicle, instruction of starting the engine is issued, not only through a key operation by the driver, but also according to the accelerator pedal position and battery charging level (SOC: State of Charge).

Start time fuel injection control in a hybrid vehicle will be described with reference to FIGS. 9 and 10.

Figure 9:
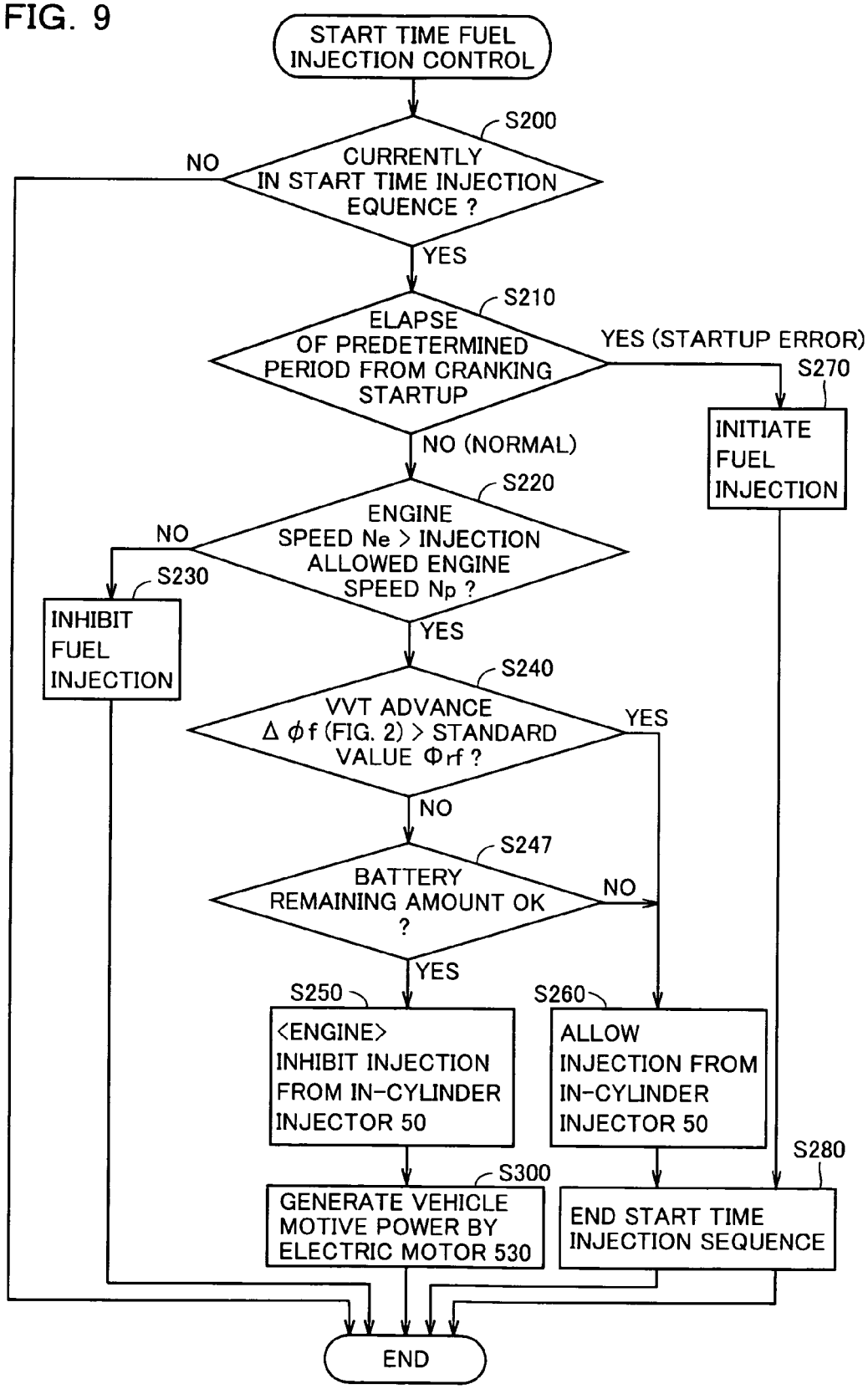
FIGS. 9 and 10 are flow charts to describe first and second examples, respectively, of start time fuel injection control according to the third embodiment of the present invention.

FIG. 9 is a flow chart to describe a first example of start time fuel injection control according to the third embodiment. FIG. 9 corresponds to start time fuel injection control when the engine system of the first embodiment (FIG. 1) is applied as engine 540 incorporated into a hybrid vehicle. The fuel injection control is executed according to a predetermined program prestored in engine ECU 300.

In comparison to the flow chart of FIG. 5, the start time fuel injection control of the third embodiment shown in FIG. 9 has step S250 executed on the condition that the remaining amount in battery 510 is at least a predetermined level (determination of YES at step S247) until the time when VVT advance $\Delta\phi f$ reaches standard value $\phi rf$ (determination of NO at step S240) by start time VVT (start time decompression control). Accordingly, fuel injection from in-cylinder injector 50 is inhibited, and the electric motor is energized to be driven by hybrid ECU 590 such that motive power for the vehicle is generated by electric motor 530 (step S300).

Even in the case where fuel injection from in-cylinder injector 50 is inhibited to avoid degradation in the exhaust emission level, the vehicle can be started smoothly by the vehicle motive power generated from electric motor 530. The determination made at step S240 is executed by comparing the SOC of battery 510 with a standard value.

It is to be noted that when the remaining amount in battery 510 is below a predetermined level (determination of NO at step S247) in the case where VVT advance Δϕf does not exceed standard value ϕrf (determination of NO at step S240), step S260 is executed to protect battery 510 and ensure the vehicle starting power. Therefore inhibition of fuel injection by in-cylinder injector 50 is canceled.

The remaining control flow in the starting time fuel injection control of the third embodiment is similar to that described in the first and second embodiments. Therefore, details of the description thereof will not be repeated.

Figure 10:
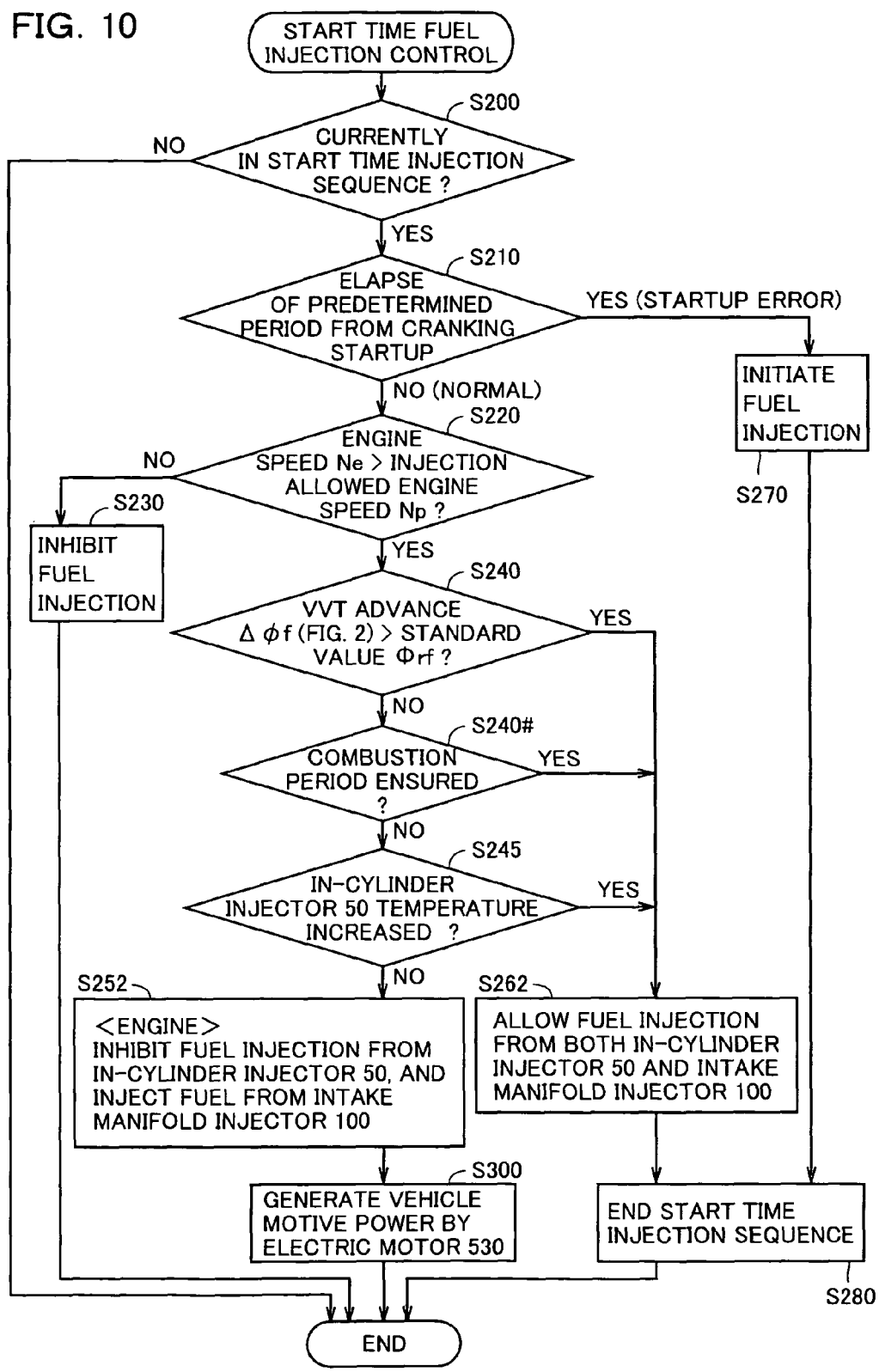

FIG. 10 is a flow chart to describe a second example of the start time fuel injection control of the third embodiment. FIG. 10 corresponds to starting time fuel injection control in which the engine system of the second embodiment (FIG. 6) is employed as engine 540 incorporated in a hybrid vehicle. The fuel injection control is executed according to a predetermined program prestored in engine ECU 300.

In comparison to the flow chart of FIG. 7, the start time fuel injection control of the third embodiment shown in FIG. 10 has fuel injection from in-cylinder injector 50 inhibited by step S252 and the electric motor is energized to be driven by hybrid ECU 590 such that motive power for the vehicle is generated by electric motor (step S300) when steps S240, S240# and S245 all result in the determination of NO.

Accordingly, the vehicle motive power is generated from electric motor 530 to allow the vehicle to be started smoothly even in the case where fuel injection from in-cylinder injector 50 is inhibited to avoid degradation in the exhaust emission level.

The remaining control flow of the start time fuel injection control of the third embodiment is similar to that described in the first and second embodiments. Therefore, details of the description thereof will not be repeated.

In accordance with a configuration in which an internal combustion engine including at least an in-cylinder injector 50 is incorporated into a hybrid vehicle, generation of vibration at the time of starting the internal combustion engine is suppressed by decompression control and degradation in the exhaust emission level is suppressed while the vehicle starting power is ensured by electric motor 530 in accordance with the start time fuel injection control of the third embodiment. Accordingly, engine vibration at the time of startup can be suppressed; degradation in the exhaust emission level can be prevented; and the vehicle starting capability can be ensured in a hybrid vehicle.

The fuel injection control of engine 5 (direct-injection engine) shown in FIG. 5 or FIG. 9 can be adapted to give priority to preventing malfunction caused by an excessively high temperature of in-cylinder injector 50 by executing step S245, likewise that shown in FIGS. 7 and 10, when determination of NO is made at step S240 (not yet arriving at the standard state).

(In-Cylinder Injection Inhibition Control Before and After Catalyst Activation)

In general, degradation in the exhaust emission level at the internal combustion engine is particularly problematic until the time when the catalyst is rendered active during which the emission removal function by a catalyst device (for example, 3-way catalytic converter) is poor, i.e. during the engine cold state period.

Figure 11:
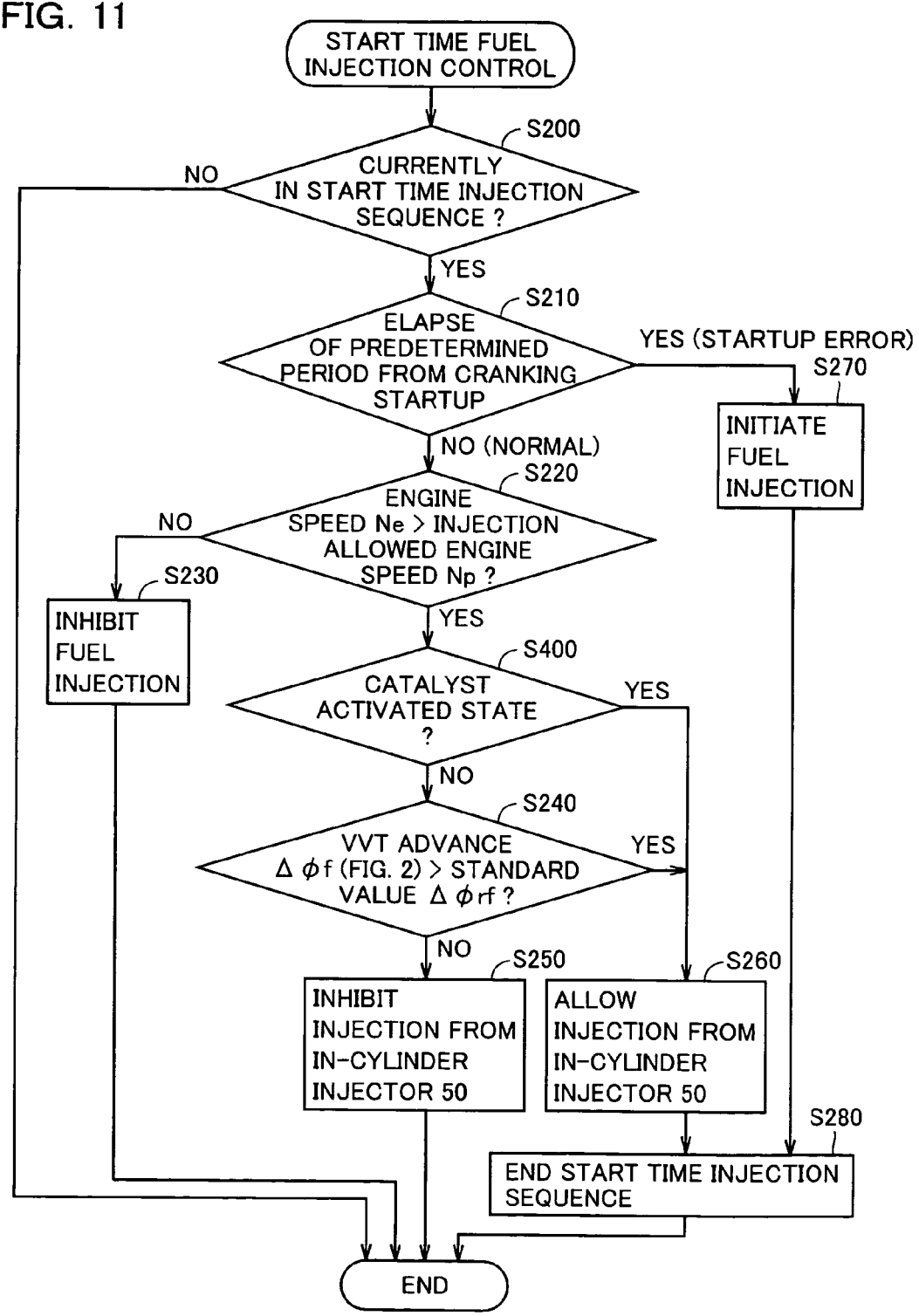
FIGS. 11 and 12 are first and second flow charts, respectively, to describe the relationship between start time fuel injection control and completion of catalyst activation of the present invention.
Figure 12:
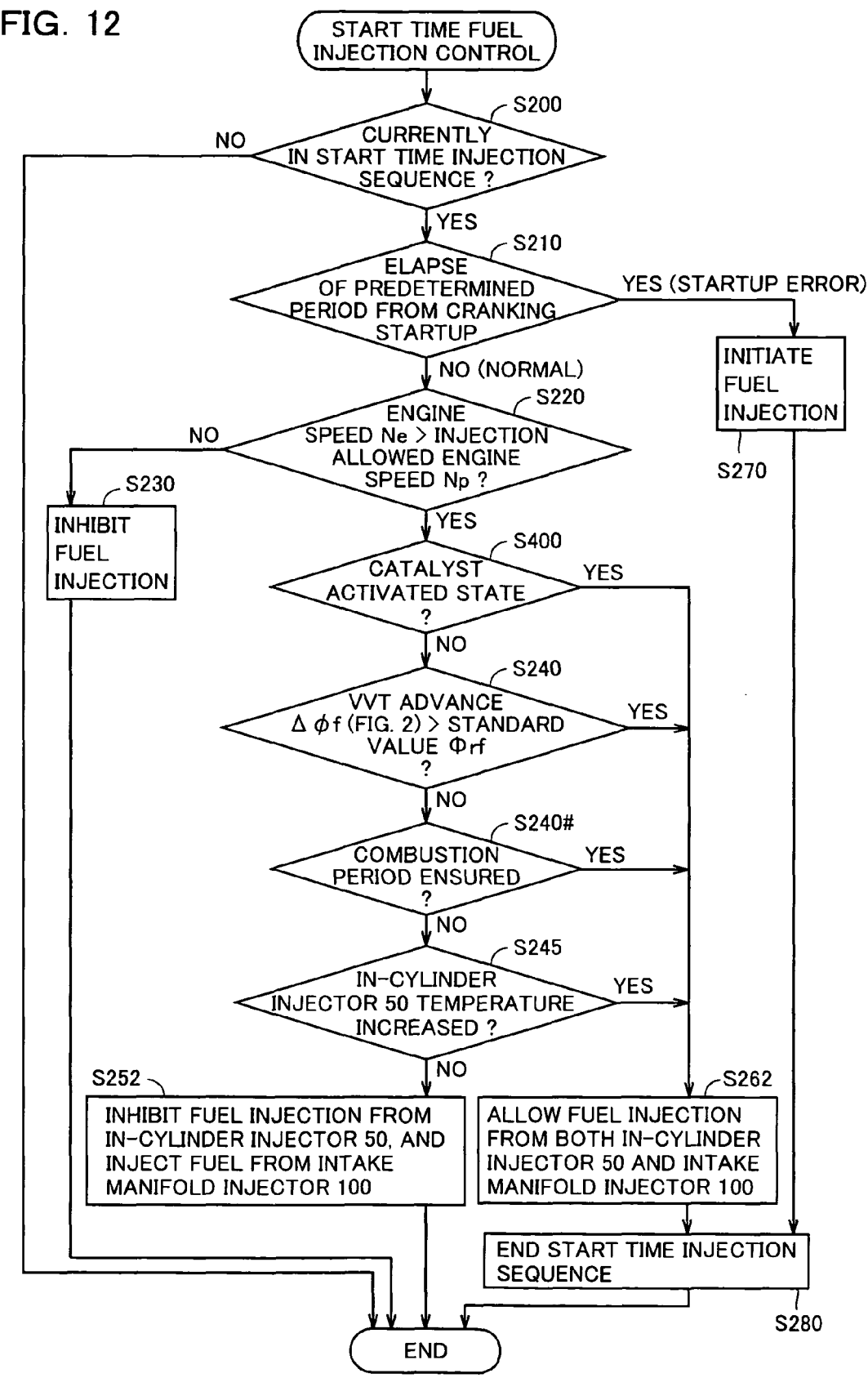

In view of the foregoing, the in-cylinder injection inhibition control set forth above may be adapted to be executed only during the period up until the catalyst is rendered active, as shown in the flow charts of FIGS. 11 and 12.

FIG. 11 corresponds to execution of in-cylinder injection inhibition control according to the first embodiment shown in FIG. 5, restricted to the time until the catalyst is rendered active, and FIG. 12 corresponds to execution of in-cylinder injection inhibition control according to the second embodiment shown in FIG. 7, restricted to the time until the catalyst is rendered active.

When determination made at step S220 is YES in accordance with the flow charts of FIGS. 11 and 12, i.e. when fuel injection initiation is allowed corresponding to increase in the engine speed, control proceeds to step S400 to determine whether the catalyst is already active or not.

When activation of the catalyst is already completed (determination of YES at step S400), control proceeds to step S260 (FIG. 11) and step S262 (FIG. 12) without executing step S240, respectively to allow fuel injection by in-cylinder injector 50. In contrast, when activation of the catalyst is not yet completed (determination of NO at step S400), an in-cylinder injection inhibition control similar to the control described in the first and second embodiments is executed by the process of steps S240 and et seq. Accordingly, in-cylinder injection inhibition control similar to the control of the first and second embodiments can be executed, restricted to the time until the catalyst is rendered active.

Although not illustrated, the start time fuel injection control of the third embodiment can be executed with the in-cylinder injection inhibition control restricted to the time until the catalyst is rendered active by executing step S400 set forth above in accordance with the flow charts of FIGS. 9 and 10 when determination is made of YES at step S220.

By such control, degradation in the exhaust emission level can be suppressed by in-cylinder injection inhibition control as in the first to third embodiments until the time the catalyst is rendered active during which the emission removal function is poor, and increase the engine output at the early stage without in-cylinder injection inhibition control after the catalyst is rendered active corresponding to the period where the emission removal function is ensured.

(Relationship Between Catalyst Warm Up Operation and In-Cylinder Injection Inhibition Control)

When the engine is at a cold state, a catalyst warm up operation is initiated in response to establishment of a predetermined condition following engine startup. For example, execution of a warm up operation is designated at an elapse of a predetermined period (for example, a predetermined number of cycles) following engine ignition at the time of engine startup when the engine is cold (typically, determination based on the engine coolant temperature).

Figure 13:
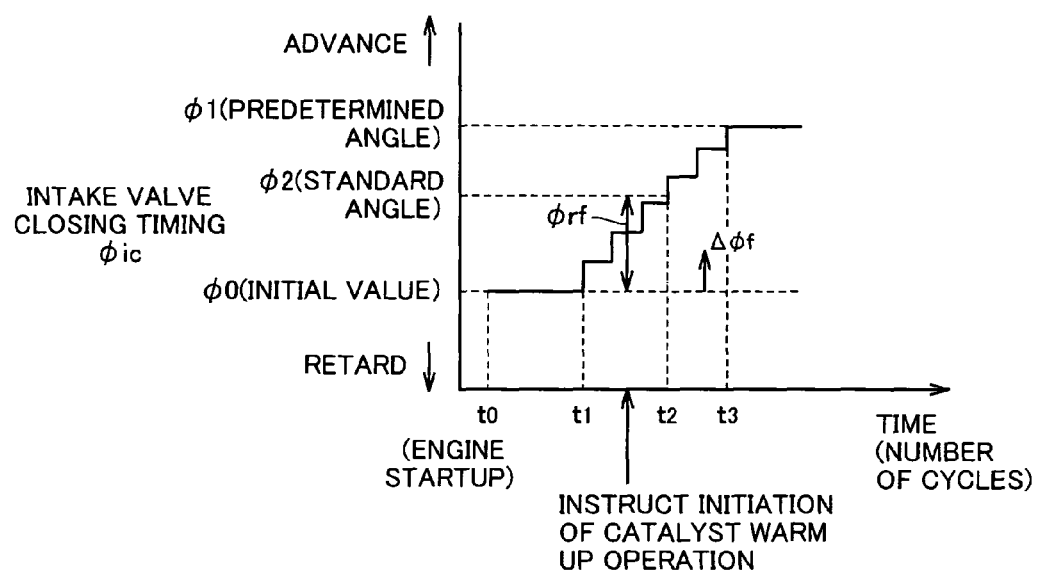
FIG. 13 is a diagram to describe the relationship of the generation timing of a catalyst warm up operation instruction and intake valve closing timing under start time fuel injection control of the present invention.

Therefore, there is a possibility of a catalyst warm up operation start instruction being issued when the VVT advance Δϕf has not reached the standard value ϕrf (during the execution period of in-cylinder injection inhibition control) following engine startup, as shown in FIG. 13. However, in-cylinder fuel injection is necessary at engine 5 of FIG. 1, and semi-stratified charge combustion based on in-cylinder fuel injection is preferable to achieve early activation of the catalyst upon ensuring the temperature and amount of exhaust at engine 5# of FIG. 6. Accordingly, there may be a case where a catalyst warm up operation cannot be initiated due to execution of in-cylinder injection inhibition control.

In such a case, the total exhaust emission level improvement effect can be increased by initiating the catalyst warm up operation to achieve early activation of the catalyst rather than conducting the in-cylinder injection inhibition control of the first to third embodiments when in a state before sufficient VVT advance is achieved.

Figure 14:
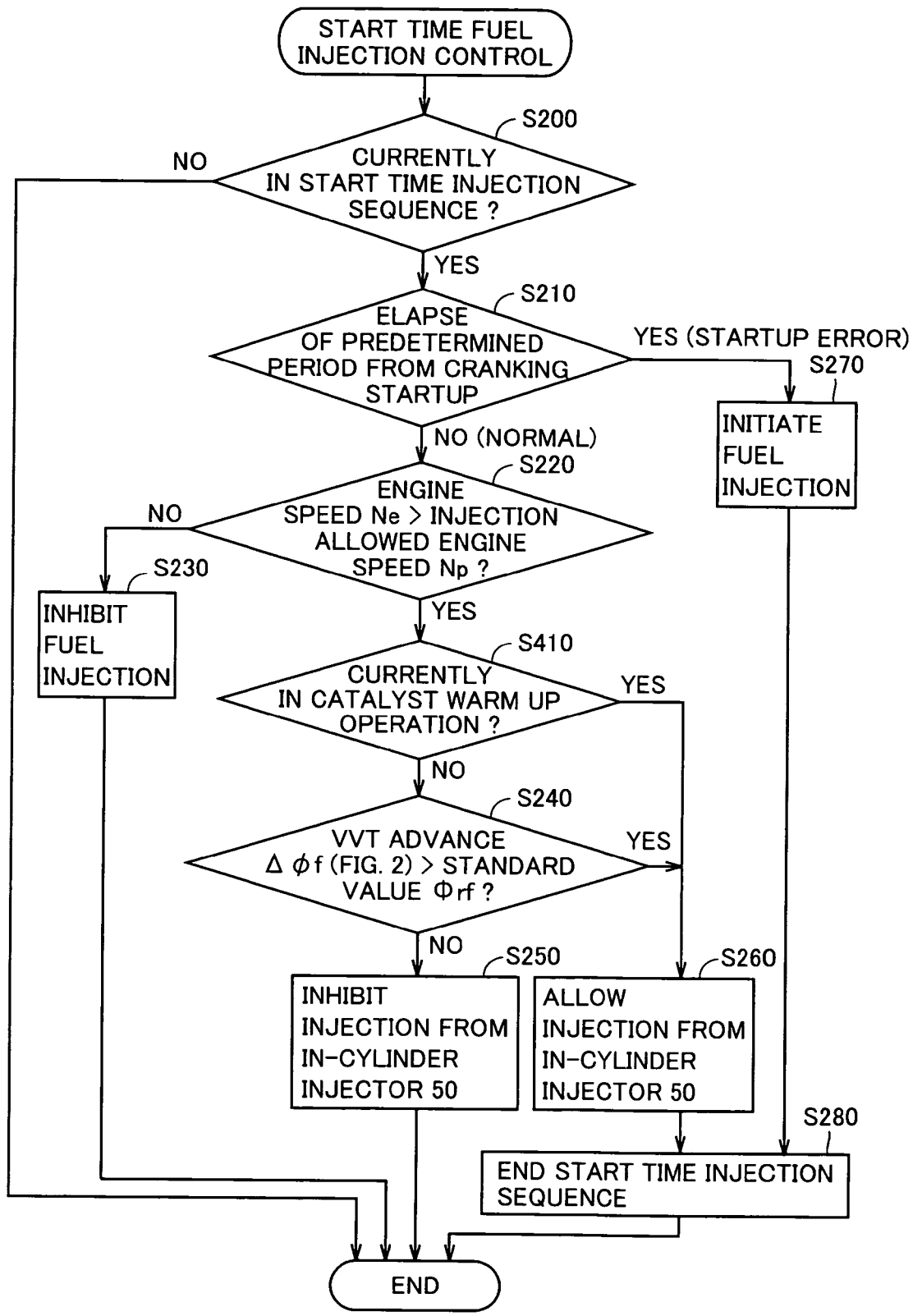
FIGS. 14 and 15 are first and second flow charts, respectively, to describe the relationship between start time fuel injection control and catalyst warm up operation of the present invention.
Figure 15:
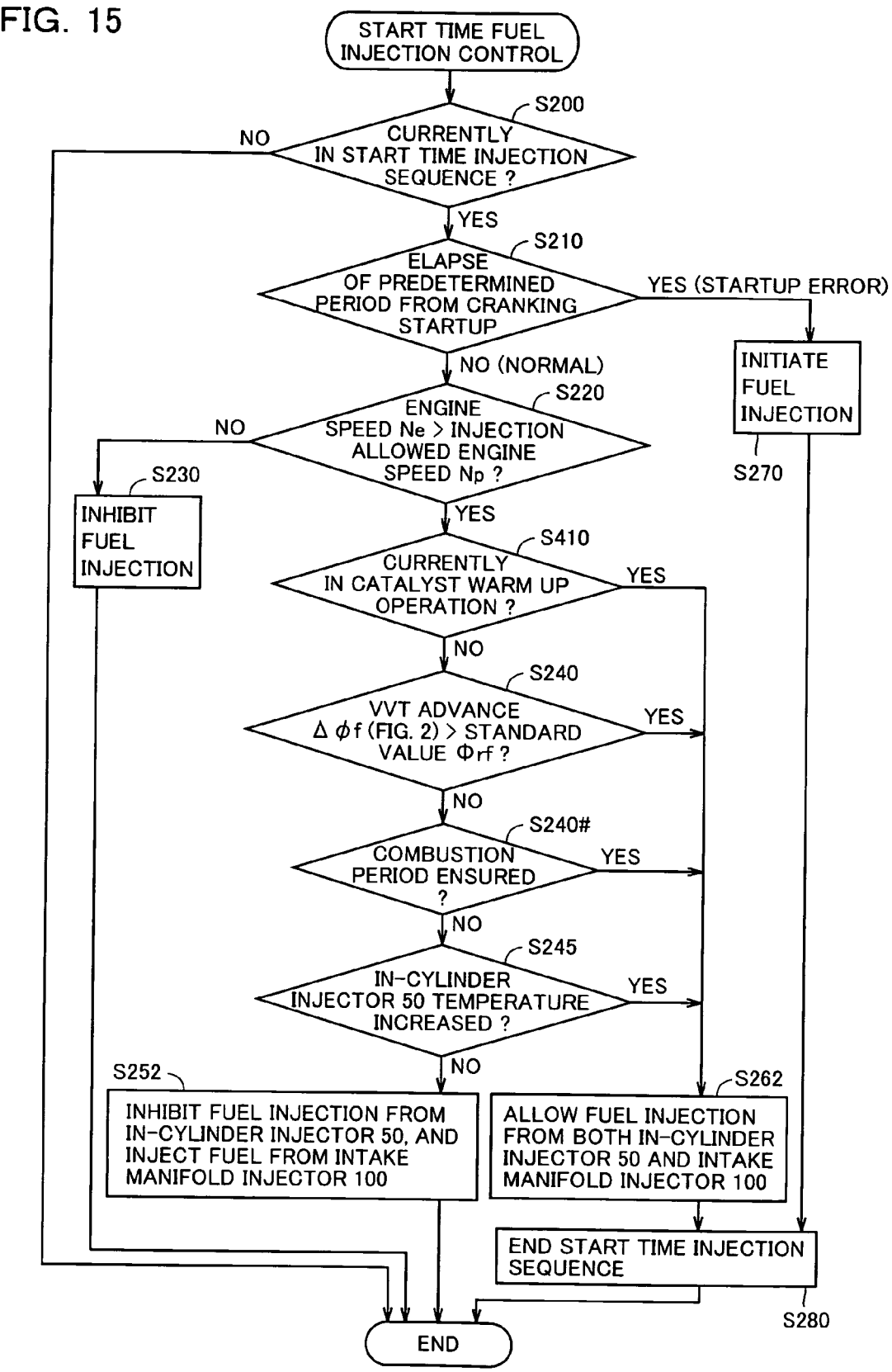

In view of the foregoing, the in-cylinder injection inhibition control set forth above may be adapted to be not executed during a catalyst warm up operation, as shown in FIGS. 14 and 15.

FIG. 14 is a flow chart corresponding to in-cylinder injection inhibition control of the first embodiment shown in FIG. 5 that is rendered non-executable during a catalyst warm up operation, and FIG. 15 is a flow chart corresponding to in-cylinder injection inhibition control of the second embodiment shown in FIG. 7 that is rendered non-executable during a catalyst warm up operation.

When determination of YES is made at step S220 in accordance with the flow charts of FIGS. 14 and 15, i.e. when initiation of fuel injection is allowed corresponding to the increased engine speed, control proceeds to step S410 to determine whether a catalyst warm up operation is currently executed or not. Determination of step S410 can be executed by setting an "ON" flag in response to an instruction to initiate a catalyst warm up operation and an "OFF" flag in response to completion of catalyst activation, for example. Determination of whether the catalyst is rendered active or not can be made based on the catalyst temperature sensed by a temperature sensor or estimated by multiplication of the exhaust amount.

When a catalyst warm up operation is currently executed (determination of YES at step S410), control proceeds to step S260 (FIG. 14) and step S262 (FIG. 15) without executing step S240, respectively, to cancel the in-cylinder injection inhibition and allow fuel injection by in-cylinder injector 50. When a catalyst warm up operation is not currently executed (determination of NO at step S410), the in-cylinder injection inhibition control is executed, similar to the control of the first and second embodiments, by the process of steps S240 and et seq. Thus, the in-cylinder injection inhibition control can be set non-executable during a catalyst warm up operation.

Although not illustrated, the start time fuel injection control of the third embodiment can have the in-cylinder injection inhibition control set non-executable during a catalyst warm up operation by executing step S410 set forth above in accordance with the flow charts of FIGS. 9 and 10 when determination of YES is made at step S220.

By such control, degradation in the exhaust emission level can be suppressed by the in-cylinder injection inhibition control, likewise the first to third embodiments, before a catalyst warm up operation is instructed, while improving the total exhaust emission level by initiating the catalyst warm up operation at the early stage without conducting the in-cylinder injection inhibition control at the time of executing the catalyst warm up operation.

By combining steps S400 and S410 set forth above, the configuration can be adapted to carry out the in-cylinder injection inhibition control of the first to third embodiments, restricted to the period of time from engine startup in an engine cold state and before a catalyst warm up operation.

The correspondence of the configuration described in FIGS. 1-15 in the present invention is set forth hereinafter. In-cylinder injector 50 corresponds to "first fuel injection mechanism" of the present invention. Intake manifold injector 100 corresponds to "second fuel injection mechanism" of the present invention. Starter 250 corresponds to "starting portion" of the present invention. With regards to the flow chart of FIG. 4, step S110 corresponds to "start time decompression portion" of the present invention. Steps S130 and S140 correspond to "decompression cancel portion" of the present invention. Step S240 (such as in FIG. 5) and step S240# (such as in FIG. 7) correspond to "determination portion" of the present invention. Steps S250 and S260 (such as in FIG. 5) and steps S252 and S262 (such as in FIG. 7) correspond to "start time fuel injection control portion" of the present invention. Step S300 (such as in FIG. 9) corresponds to "start time motive power partake control portion" of the present invention.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A control apparatus for an internal combustion engine including first fuel injection means for injecting fuel into a combustion chamber, and allowing at least intake valve control for controlling an intake air amount into said combustion chamber by an intake valve, said control apparatus comprising:

starter means for starting said internal combustion engine, start time decompression means for setting said intake air amount as an initial value of said intake valve control, said intake air amount corresponding to decompression in said combustion chamber at startup of said internal combustion engine, decompression cancel means for gradually altering said intake air amount from said initial value to increase the pressure in said combustion chamber higher than at startup, following startup of said internal combustion engine, determination means for determining whether a compression state in said combustion chamber has reached a predetermined standard state, start time fuel injection control means for inhibiting fuel injection from said first fuel injection means until a time when said determination means determines that the compression state in said combustion chamber has reached said predetermined standard state, and allowing fuel injection from said first fuel injection means after said time, at startup of said internal combustion engine, and second fuel injection means for injecting fuel into an intake port and/or an intake manifold, wherein said start time fuel injection control means inhibits fuel injection from said first fuel injection means and instructs fuel injection by said second fuel injection means until the time when said determination means determines that the compression state in said combustion chamber has reached said predetermined standard state.

2. The control apparatus for an internal combustion engine according to claim 1, wherein said start time fuel injection control means establishes a fuel injection inhibition period of said first fuel injection means until a catalyst through which exhaust from said internal combustion engine passes is rendered active.

3. The control apparatus for an internal combustion engine according to claim 1, wherein said start time fuel injection control means allows fuel injection from said first fuel injection means regardless of the determination by said determination means during a warm up operation of a catalyst through which exhaust from said internal combustion engine passes.

4. The control apparatus for an internal combustion engine according to claim 1, said internal combustion engine being incorporated in a vehicle together with a motive power source besides said internal combustion engine, and further comprising start time motive power partake control means for instructing generation of motive power of said vehicle by said motive power source until the time when said determination means determines that the compression state in said combustion chamber has reached said predetermined standard state.

5. The control apparatus for an internal combustion engine according to claim 4, wherein said start time fuel injection control means establishes a fuel injection inhibition period of said first fuel injection means until a catalyst through which exhaust from said internal combustion engine passes is rendered active.

6. The control apparatus for an internal combustion engine according to claim 4, wherein said start time fuel injection control means allows fuel injection from said first fuel injection means regardless of the determination by said determination means during a warm up operation of a catalyst through which exhaust from said internal combustion engine passes.

7. A control apparatus for an internal combustion engine including a first fuel injection mechanism configured to inject fuel into a combustion chamber, and allowing at least intake valve control for controlling an intake air amount into said combustion chamber by an intake valve, said control apparatus comprising:

a starter unit configured to start said internal combustion engine, a start time decompression unit for setting said intake air amount as an initial value of said intake value control, said intake air amount corresponding to decompression in said combustion chamber at startup of said internal combustion engine, a decompression cancel unit for gradually altering said intake air amount from said initial value to increase pressure in said combustion chamber higher than at startup, following startup of said internal combustion engine, a determination unit for determining whether a compression state in said combustion engine has reached a predetermined standard state, a start time fuel injection control unit for inhibiting fuel injection from said first fuel injection mechanism until a time when said determination unit determines that the compression state in said combustion chamber has reached said predetermined standard state, and allowing fuel injection from said first fuel injection mechanism after said time, at startup of said internal combustion engine, and a second fuel injection mechanism configured to inject fuel into an intake port and/or an intake manifold, wherein said start time fuel injection control unit inhibits fuel injection from said first fuel injection mechanism and instructs fuel injection by said second fuel injection mechanism until the time when said determination unit determines that the compression state in said combustion chamber has reached said predetermined standard state.

8. The control apparatus for an internal combustion engine according to claim 7, wherein said start time fuel injection control unit establishes a fuel injection inhibition period of said first fuel injection mechanism until a catalyst through which exhaust from said internal combustion engine passes is rendered active.

9. The control apparatus for an internal combustion engine according to claim 7, wherein said start time fuel injection control unit allows fuel injection from said first fuel injection mechanism regardless of the determination by said determination unit during a warm up operation of a catalyst through which exhaust from said internal combustion engine passes.

10. The control apparatus for an internal combustion engine according to claim 7, said internal combustion engine being incorporated in a vehicle together with a motive power source besides said internal combustion engine, and further comprising a start time power split control unit for instructing generation of motive power of said vehicle by said motive power source until the time when said determination unit determines that the compression state in said combustion chamber has reached said predetermined standard state.

11. The control apparatus for an internal combustion engine according to claim 10, wherein said start time fuel injection control unit establishes a fuel injection inhibition period of said first fuel injection mechanism until a catalyst through which exhaust from said internal combustion engine passes is rendered active.

12. The control apparatus for an internal combustion engine according to claim 10, wherein said start time fuel injection control unit allows fuel injection from said first fuel injection mechanism regardless of the determination by said determination unit during a warm up operation of a catalyst through which exhaust from said internal combustion engine passes.

* * * * *